March 25, 1969  N. A. BONACCI  3,434,168
METHOD OF MAKING A LOBULAR THREADED FASTENER
Filed Sept. 26, 1967
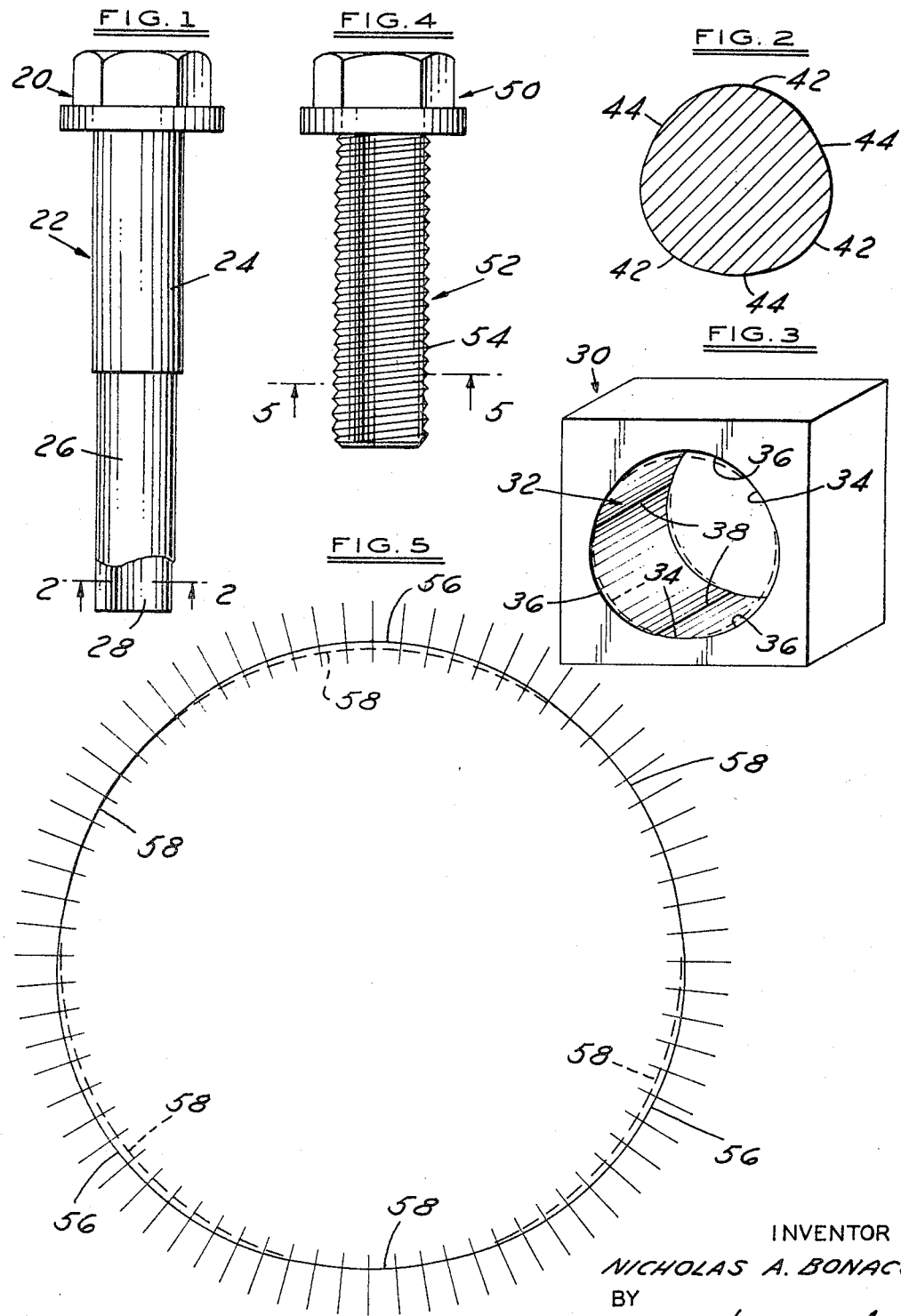
INVENTOR
NICHOLAS A. BONACCI
BY
Burton & Parker
ATTORNEYS

United States Patent Office 3,434,168
Patented Mar. 25, 1969

3,434,168
METHOD OF MAKING A LOBULAR THREADED FASTENER
Nicholas A. Bonacci, Detroit, Mich., assignor to Maynard Manufacturing Company, East Detroit, Mich., a corporation of Michigan
Filed Sept. 26, 1967, Ser. No. 670,631
Int. Cl. B21k *1/44;* F16b *25/00, 33/02*
U.S. Cl. 10—27
4 Claims

ABSTRACT OF THE DISCLOSURE

This disclosure relates to a method of making lobular threaded fasteners, including forming of a female die having a central cylindrical aperture and an odd number of uniformly circumferentially spaced scallops, forcing the fastener blank into the die, and generating a thread on the blank thereby blending the ends of the scallops into the circumference of the cylinder.

Field of the invention

This invention relates to a method of forming screws and threaded fasteners having a predetermined lobular interference with an internally threaded member, which is less than the interference of the more conventional cylindrical threaded fasteners. A general object of such fasteners is to reduce the assembly torque of threaded fasteners.

Description of the prior art

The lobular threaded fasteners shown by the prior art are generally difficult, if not impossible, to manufacture according to the theoretical configuration. Examples of lobular threaded fasteners shown by the prior art are as follows:

United States Patents 2,352,982, 2,484,644, 2,656,740, 2,856,617, 2,873,641, 2,991,491, 3,050,775, 3,195,156, 3,246,556, 3,247,877, 3,249,142.

Foreign Patents—Austria: 210,236, July 1960; Great Britain: 957,675, May 1964; Japan: 223,231 June 1959.

The majority of the referenced lobular threaded fasteners are self-tapping, and as such have an extreme arcuate polygonal cross section. Further, the torque requirements of self-tapping screws are considerably greater than threaded fasteners adapted to be received in prethreaded openings, and therefore preferably have a greater degree of "out-of-round" than screws for threaded openings. The commercial form of the cross section of self-tapping screws may be characterized as arcuate triangles, wherein the major arcs are generated with a radius greater than the cylinder of revolution of the fastener, as shown by FIGURES 14 and 17 of U.S. Patent 3,195,156. The apices of the arcuate triangle are blended into the major arcs by smaller radii, as shown by FIGURE 18 of the referenced patent. Thus a tri-lobular threaded fastener is generated by six arcs.

In the referenced Phippard design, as shown by U.S. Patents 3,195,156, 3,246,556 and 3,249,142, the theoretical blank configuration provides a constant centerless thread rolling pressure, because each of the chords perpendicular to the tangents are theoretically equal. In practice, however, it is extremely difficult to produce a blank extrusion die of the theoretical configuration, because of the complex design, and the fact that the generation arcs have a greater diameter than the diameter of the die aperture, or "cylinder of revolution." Further, even a theoretically perfect blank will be deformed during the thread rolling process, partly because the "pressure chords" do not pass through the geometric center of the blank. By "pressure chords" I mean the chords perpendicular to the tangents of the blank, which are simultaneously engaged by the parallel centerless thread rolling dies. In fact, the only geometric configuration wherein the pressure chords are equal, and pass through the geometric center of the blank, is a perfect cylinder having a circular cross section. The lobular construction has, nevertheless proved to be a considerable advantage over cylindrical threaded members where reduced torque is desired.

The United States patent to Evans 3,247,877, incorporated the lobular configuration in a threaded fastener adapted to be received in a prethreaded aperture, however the design is even more complex than the above referenced Phippard configuration. For example, the tri-lobular configuration shown in FIGURE 6 of Evans is generated by plotting a series of points on the 15 degree diameters of the cylinder of revolution, where a predetermined increment is added to one end of the diameter and subtracted from the other. The points are then blended by a series of irregular curves. In the theoretical resultant structure, all lines passing through the geometric center of the cylinder of revolution are equal, but the pressure chords are not. Hence, even a theoretically perfect blank will deform as the threads are rolled on the blank because the thread rolling dies are parallel, and the pressure is transmitted through the "pressure chords," not the geometric center. Further, the dies necessary to form the blank are more complex and expensive than the dies required by the Phippard design because the circumference is generated by irregular curves.

It should also be noted that the Evans configuration is limited to a specific degree of "out-of-round," beyond which the curves adjacent the lobes extend back toward the axis of the blank. Therefore the Evans design is not satisfactory for self-tapping screws, or where a greater degree of out-of-round is desired.

Another major problem of the Phippard and the Evans designs is the unpredictability of the final threaded fastener. Because of the complexity of the cross section of the fastener, and the deformation during thread rolling, it is difficult to predict the final configuration of the fastener, after threading, from the configuration of the blank. I have found that the configuration of each blank size must be determined by trial and error to meet the consumer's specifications. Further, the amount of deformation is dependent on such variables as the diameter of the screw, the material of the blank including the resiliency and hardness of the metal, and even the method of forming the die. A change in any of these variables may require redesign, and retooling or replacement of the die, and the expense of the complex dies is considerable.

Summary of the invention

The method of my invention includes producing a female die by forming a cylindrical aperture, and an odd number of substantially uniformly circumferentially spaced scallops. By "scallops," I mean a plurality of substantially cylindrical segments formed in the circumference of the cylindrical opening in the die. The scallops are generated from a point or line within the circumference of the cylinder, on a radius through the axis of the cylinder, and have a radius less than the radius of the cylinder of the aperture. The scallops may therefore be formed by a rotating cutting tool received in the cylindrical aperture, which is not feasible where the diameter of the arcs are greater than the inscribed cylinder, as shown by the prior art.

The fastener blank is then forced into the die to induce a generally scalloped lobular cross section in the blank. This may be accomplished by extruding the blank through the die, or the blank may be "upset" in the die. The blank is "upset" by forcing the blank, or a portion of the blank, into a die having a closed end; thereby inducing the scalloped lobular configuration in the blank. Thus, the end of a cylindrical blank may be upset to form a threaded fastener having a cylindrical shank portion, and a lobular work-entering end portion.

Finally, a thread is generated on the blank, on a centerless basis, by a pair of parallel dies. It is important to note that rolling of a thread on the blank blends the ends of the "scallops" in the blank into the circumference of the cylinder, thereby producing a relatively smooth cross section in the threaded fastener. Thus, the unavoidable deformation of threading a lobular blank is used to advantage in the method of my invention, and the scalloped lobular blank provides a place for the metal to flow. Conversely, in the Phippard and Evans fasteners the die is designed to produce a smooth, relatively complex, external configuration on the blank, and the deformation of the blank in the thread rolling process is considered detrimental.

It can be seen that the method of my invention is relatively simple when compared to the methods of Phippard and Evans. The die is considerably less complex, and therefore less expensive than the dies formed by the methods shown by the prior art. Further, the volume of the die is relatively simple to calculate, and it is therefore considerably simpler to predict the final configuration of the threaded fastener, from the configuration of the blank.

Other advantages, and meritorious features of my invention will more fully appear from the following specification, claims, and accompanying drawings, wherein:

*Brief description of the drawings*

FIGURE 1 is a side elevation of one embodiment of a lobular fastener blank formed by the method of this invention;

FIGURE 2 is a cross sectional end view of the fastener blank shown in FIGURE 1, in the direction of arrows 2—2;

FIGURE 3 is a perspective view of a die adapted to the method of my invention;

FIGURE 4 is a side elevation of a lobular threaded fastener formed by the method of my invention; and FIGURE 5 is a schematic cross sectional end view of the threaded fastener shown in FIGURE 4, in the direction of arrows 5—5.

*Description of the drawings and method of my invention*

The threaded fastener blank shown in FIGURES 1 and 2 has a head portion 20, and a shank portion 22. The head portion is adapted to be engaged by a wrench, or the like, and therefore may be hexagonal as shown. The shank portion includes an unthreaded cylindrical portion 24, a reduced diameter cylindrical work portion 26 which will be threaded with a straight thread, and a lobular work-entering end 28. The cylindrical shank portions 24 and 26 may be extruded in a conventional die, or formed by other well known techniques.

The lobular work-entering end portion 28 has been formed in the "scalloped" die 30 shown in FIGURE 3. The die aperture 32 is formed by first providing a circular cross section cylindrical aperture, as shown partially in phantom, at 34. An odd number of substantially uniformly spaced cylindrical scallops 36 are then generated in the circumference of the cylindrical aperture 34. The embodiment of the die shown in FIGURE 3 has three cylindrical scallops 36 spaced approximately 120° about the circumference of the cylindrical aperture, each generated by a radius less than the radius of the cylindrical aperture 34. Thus the scallops may be formed by a rotating tool received within the cylindrical aperture. This is an important distincton over the lobular threaded fastener forms shown by the prior art, which are generated by three major arcs of a diameter greater than the circumscribed cylinder, which must be formed by special tools.

The apices defined by the major arcs then blended by smaller arcs; requiring at least six arcs for a trilobular fastener. It should be noted at this point that the scallops 36 in the blank do not blend smoothly with the cylindrical aperture 34, and the juncture is defined by lines 38 as shown in FIGURE 5.

The lobular cross section of the shank 28 is formed by forcing the blank end into the die aperture 32, which induces the generally scalloped lobular cross section shown in FIGURE 2. The induced cross section of the fastener blank has three scallops or lobes 42 projecting from the intervening cylinder 44. An odd number of scallops is preferred to assure centering of the resultant threaded fastener in the female aperture, however it will be understood by those skilled in the art that any odd number of lobes is commercially satisfactory.

The lobular cross section of the blank may be induced by upsetting the blank in the die, or by extruding the blank through the die aperture 32. Where the lobular portion is relatively short, as shown in FIGURE 1 at 28, it may be preferable to upset the end of the blank rather than extruding it. This is accomplished by forcing the end of the cylindrical blank into a die having an open-ended chamber, with the cross sectional configuration shown in FIGURE 3, which upsets the end of the blank as shown. Where the lobular portion extends over a major portion of the blank, as shown in FIGURE 4, it may be preferable to extrude the blank.

The threaded fastener embodiment shown in FIGURES 4 and 5 has a hexagonal head portion 50, and a lobular threaded shank 52. The blank for the fastener has been formed by forcing the blank into the aperture of a scalloped die, such as shown in FIGURE 3 and described hereinabove, except that the entire shank of this embodiment is lobular. Therefore, it may be preferable to extrude the blank through the die aperture. The threads 54 are then generated on the shank portion on a "centerless basis" between a pair of parallel thread rolling dies, not shown. A semi-schematic cross section of the resultant structure is shown in FIGURE 5.

In the thread rolling process, the blank is rolled under pressure between parallel dies, which causes the scalloped cross section to become more circular. The scallops are thereby blended into the circumference of the cylinder 58, shown partially in phantom in FIGURE 5 for clarity, defining a smooth continuous cross section. The method of my invention has thus achieved the object of the methods shown by the prior art by a considerably simpler process, and the resultant cross sectional configuration has all the advantages claimed by the more complex structures.

It will be understood by those skilled in the art that various modifications may be made to the method of my invention to provide threaded fasteners not shown by the drawings. For example, a lobular work-entering end may be induced on the lobular shank of the threaded fastener shown in FIGURE 4, thereby providing a reduced diameter work-entering end on a lobular fastener. Further a cylindrical work-entering end may be induced in a lobular shank, which would be the inverse of the fastener shown in FIGURE 1. A greater number of scallops may also be provided, as described hereinabove.

What is claimed is:

1. A method of making a lobular threaded fastener, comprising the steps of:
    (a) forming a generally cylindrical fastener blank,
    (b) deforming the blank by forcing the blank into a die inducing three or more radially outwardly extending circular scallops substantially evenly spaced about the periphery of the blank having a radius less than the radius of the cylindrical blank but substantially greater than one half the radius of the blank, and
    (c) generating a continuous thread on the blank on a centerless basis and simultaneously blending the ends of the spaced scallops into the circumference of the cylindrical blank to provide a smooth continuous thread.

2. The method of making a lobular threaded fastener defined in claim 1, characterized in that the blank is formed by extruding wire through a generally cylindrical die and only the end of the blank is upset in the die thereby forming a threaded fastener having a generally cylindrical shank portion and a generally scalloped lobular end portion.

3. The method of making a lobular threaded fastener defined in claim 1, characterized in that the scallops in the blank have substantially the same radius and are each generated from points in the radius of the circumscribing cylinder of the blank substantially equidistant from the axis of the cylinder.

4. The method of making a lobular fastener defined in claim 1, characterized in that three subtantially equal scallops are generated in the blank spaced substantially 120 degrees about the circumference of the circumscribing cylinder of the blank.

References Cited

UNITED STATES PATENTS

| | | | |
|---|---|---|---|
| 3,104,161 | 9/1963 | Carlson | 10—10 XR |
| 3,209,383 | 10/1965 | Carlson. | |
| 3,213,742 | 10/1965 | Kahn. | |

LEONIDAS VLACHOS, *Primary Examiner.*

U.S. Cl. X.R.

10—10, 152; 85—47